Feb. 8, 1938.  O. G. BEARDSLEY  2,107,881
COUPLING FOR COMBINED MOTOR CARS AND TRAILERS
Filed March 3, 1937
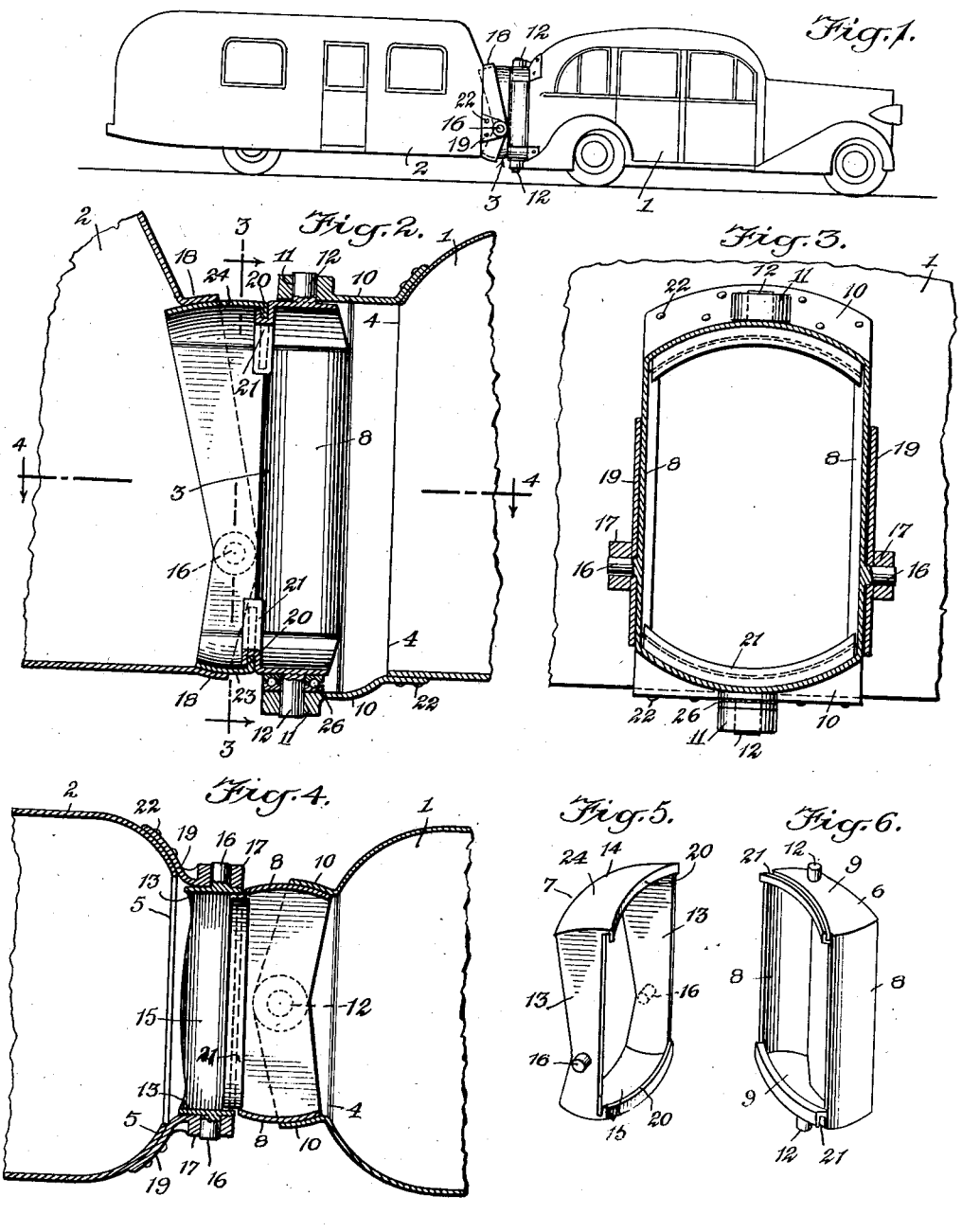
WITNESSES
INVENTOR
O. G. Beardsley
BY
ATTORNEYS Patented Feb. 8, 1938

2,107,881

UNITED STATES PATENT OFFICE 2,107,881

COUPLING FOR COMBINED MOTOR CARS AND TRAILERS

Osmer Gray Beardsley, South Bend, Ind.

Application March 3, 1937, Serial No. 128,737

4 Claims. (Cl. 280—33)

The present invention relates to a coupling for combined motor car and trailer so constructed as to form a passageway from one to the other. It has for its object to provide a passageway leading from the motor car to the trailer and to so construct the passageway that it will permit the usual relative movements of the motor car and trailer which occur while going around a curve or because of inequalities in the road surface.

A further object is to provide a coupling so constructed that the motor car and trailer are connected securely and at the same time may move with relation to each other, the coupling comprising parts turning about transverse vertical and horizontal axes at right angles to each other and swiveling about a longitudinal horizontal axis.

A further object is to provide such a coupling and housing which while permitting the relative movements between the motor car and trailer referred to will at the same time provide a weatherproof passageway between the motor car and trailer, excluding dust and rain.

The present invention is shown in the accompanying drawing in which—

Fig. 1 shows in side elevation a motor car, trailer and coupling embodying my invention;

Fig. 2 shows a vertical sectional view through the meeting ends of the motor car and trailer and the passageway connecting the same;

Fig. 3 is a vertical sectional view taken on the line 3—3 in Fig. 2, looking in the direction of the arrows on that line;

Fig. 4 is a horizontal sectional view taken on the line 4—4 in Fig. 2, looking in the direction of the arrows on that line;

Figs. 5 and 6 show in perspective the two members of the coupling which form the passageway.

Similar reference characters will be employed throughout the specification to designate corresponding parts.

The motor car 1 and the trailer 2 are permanently connected by the coupling 3. The motor car and trailer may be of any usual or preferred construction. The motor car may have a body made of pressed steel or other metal, and the body of the trailer may also be of metal, but obviously the present invention is not concerned with the construction of either except as hereinafter pointed out. The motor car 1 has an opening 4 in its rear end and the trailer has an opening 5 in its forward end, the openings being of a size to permit passage therethrough so that persons in either of the vehicles may pass from one to the other without passing outside. The coupling 3 comprises two members 6 and 7 made of any suitable metal preferably pressed, such as forged or pressed steel, and are substantially rectangular in shape. The member 6 has side members 8 and top and bottom members 9. The opening 4 at the back of the motor car 1 is provided with a housing 10 surrounding the opening 4 within which is fitted the member 6 of the coupling, the sides of the housing 10 being curved as shown in Fig. 4 to accommodate the curved outer face of the side members 8 of the member 6. The housing 10 carries bearings 11 in vertical alinement with each other, which receive the pintles 12 at the top and bottom of the member 6 and when positioned as shown in Fig. 2 the member 6 may rock about the vertical axis formed by the bearings 11 and pintles 12, while the curved outer faces of the side members 8 will at all times be in close contact with the inner face of the curved wall of the housing 10.

The member 7 of the coupling is also rectangular in shape having straight side members 13 and curved top and bottom members 14 and 15, the curvature being both lateral and longitudinal. The side members 13 carry pintles 16 which fit in bearings 17 supported at each side of the housing 18 which surrounds the opening 5 in the trailer 2. The pivotal action of the coupling member 7 is about a horizontal axis at right angles to the pivoted axis of the complementary coupling member 6, both axes being transversely of assembly. The bearings 17 are carried by brackets 19 fixedly secured to the housing 18. The two members 6 and 7 of the coupling are connected together at the top and bottom for a swiveling movement, the member 7 having ribs or flanges 20 at top and bottom which fit into grooves 21 carried by the top and bottom 9 of the member 6.

The curvature of the top and bottom of the coupling members defines an arc struck from the longitudinal central axis passing through the coupling at a point substantially equal distances from the top and bottom thereof. When the flanges 20 are fitted into the grooves 21 the members of the coupling will be held together but free to move independently of each other about vertical and horizontal axes and to also swivel about a longitudinal horizontal axis.

Any suitable means may be employed to secure the housing 10 to the rear of the motor car 1 and the brackets 19 to the housing of the trailer as, for instance, the rivets 22. It will be observed that the member 7 of the coupling is not only rounded laterally but is also rounded rearwardly as indicated at 23 and 24, and that the curved portions 23 and 24 are in close contact with the inner surface of the housing 18. Thus the rocking of the member 7 at the forward end of the trailer will not produce any separation between the coupling member 7 and the housing of the trailer.

From the foregoing it will be noted that when the parts are assembled a free and clear passageway is provided whereby persons may go from the motor car to the trailer without passing out-of-doors and that at all times this passageway will be closed and proof against the admission of dust or water or, as stated in the foregoing specification, will be "weatherproof."

If desired, a ball bearing 26 may be employed to support the member 6 of the coupling. The outer surfaces of the side members 8 of the coupling member 6 will be curved as indicated in Fig. 4, and have close contact with the curved inner wall of the housing 10.

It is thought that the operation has been sufficiently described in connection with the foregoing description of the construction and that a further description of the operation will be found unnecessary.

I claim:

1. In combination, a motor car and a trailer, having a door opening in their meeting ends, and a coupling surrounding and enclosing the door openings, said coupling comprising two members mounted for pivotal movement about independent axes at right angles to each other and connected to each other for swiveling movement about a horizontal axis.

2. In combination, a motor car and a trailer, having a door opening in their meeting ends, and a coupling connecting them for relative swinging and swiveling movement, said coupling comprising frame members forming an enclosed passageway between the respective door openings, one of said frame members mounted upon the motor car to turn about a vertical axis and the other frame member mounted upon the trailer to swing about a horizontal axis.

3. In combination, a motor car and a trailer, having a door opening in their meeting ends, and a coupling connecting them for relative swinging and swiveling movement, said coupling comprising frame members forming an enclosed passageway between the respective door openings, one of said frame members mounted upon the motor car to turn about a vertical axis and the other frame member mounted upon the trailer to swing about a horizontal axis, and said coupling members being permanently connected to each other for a swiveling action about a horizontal axis.

4. In combination, a motor car and a trailer, having a door opening in their meeting ends, and a coupling connecting them for relative swinging and swiveling movement, said coupling comprising frame members forming an enclosed passageway between the respective door openings, one of said frame members mounted upon the motor car to turn about a vertical axis and the other frame member mounted upon the trailer to swing about a horizontal axis, and said coupling members being permanently connected to each other for a swiveling action about a horizontal axis, housings mounted respectively on the motor car and trailer enclosing and supporting each of the coupling members so constructed as to permit the relative movement of the members to a limited extent while maintaining a weatherproof engagement of the coupling members with the respective housings.

OSMER GRAY BEARDSLEY.